Sept. 14, 1965 J. A. GREENWOOD 3,205,996

SPACE COMPUTER FOR JUSTIFYING TYPING MACHINE

Filed Jan. 24, 1962 5 Sheets-Sheet 1

INVENTOR:

Joseph Arthur Greenwood by Peter L. Tailer

SPACE COMPUTER FOR JUSTIFYING TYPING MACHINE

Filed Jan. 24, 1962 5 Sheets-Sheet 2

INVENTOR:
Joseph Arthur Greenwood by Peter S. Tailer

AGENT.

INVENTOR:
Joseph Arthur Greenwood
by Peter L. Tailer
AGENT.

*INVENTOR:*
Joseph Arthur Greenwood
by Peter L. Tailer

AGENT.

SPACE COMPUTER FOR JUSTIFYING TYPING MACHINE

Filed Jan. 24, 1962 5 Sheets-Sheet 5

*INVENTOR:*
Joseph Arthur Greenwood
by Peter L. Tailer
AGENT.

3,205,996
SPACE COMPUTER FOR JUSTIFYING TYPING MACHINE

Joseph Arthur Greenwood, 44 Cayuga Ave., Rockaway, N.J.

Filed Jan. 24, 1962, Ser. No. 168,497
4 Claims. (Cl. 197—84)

This invention relates in general to typing machines and, more particularly, to those typing machines capable of printing a great range of letters, numbers, characters and symbols and to those typing machines, which write justified lines automatically with only one keyboard operation.

It is a principal object of this invention to provide a less expensive, more rugged, more easily serviced, and more efficient typing machine for the composition of justified lines wherein the spacing between words is automatically selected to achieve the complete justification of each full line.

Another object of this invention is to provide a typing machine in which a great variety of font styles and sizes can readily be made available and in which individual characters within a font may readily be interchanged.

A further object of this invention is to provide a typing machine from which a greater number of characters may be struck from the keyboard.

Yet another object of this invention is to provide a superior typing machine which is more versatile and which may more rapidly and inexpensively provide typed and justified copy which may be used to produce photo offset masters for the printing of books and the like.

Still another object of this invention is to provide a typing machine using a flat platen which affords the compositor greater visibility and greater flexibility in composition.

Additional objects, advantages and features of invention reside in the construction, arrangement and combination of parts involved in the embodiment of the invention and its practice otherwise as will be understood from the following description and accompanying drawing wherein.

Figures 1, 2, 2A, 3, 4, 5, 6:
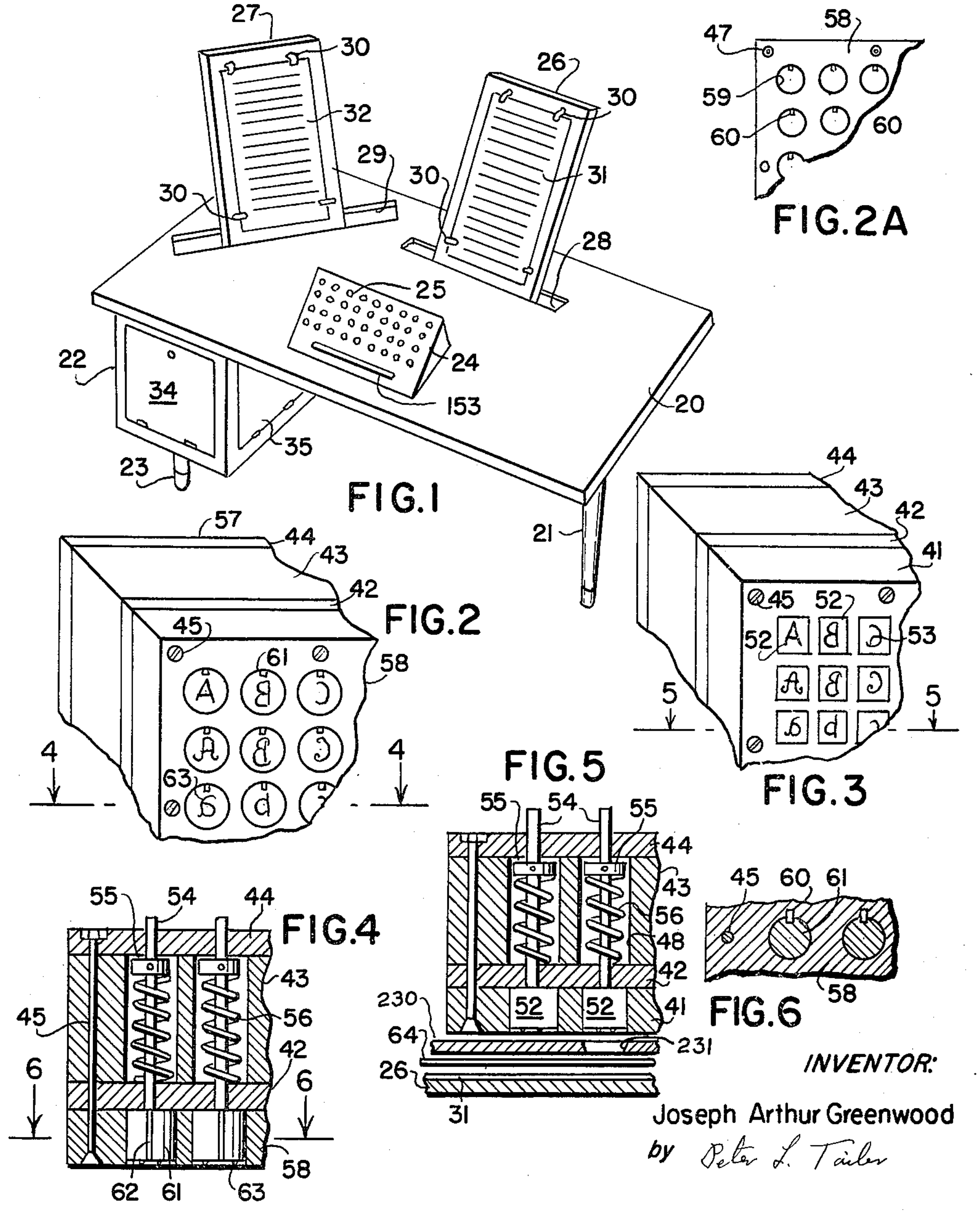
FIGURE 1 is a perspective view of the typing machine.
FIGURE 2 is a rear view of a fragment of a corner of a type magazine containing cylindrical type.
FIGURE 2A is a plan view of a fragment of a type containing wafer for cylindrical type.
FIGURE 3 is a rear view of a fragment of one corner of a type magazine containing square type.
FIGURE 4 is a horizontal section taken on line 4—4 of FIGURE 2.
FIGURE 5 is a horizontal section taken on line 5—5 of FIGURE 3 with fragments of a type guide block, typewriter ribbon, and a platen shown in position in front of the type magazine.
FIGURE 6 is a vertical section taken on line 6—6 of FIGURE 4.

Referring to the drawing in detail, FIGURE 1 shows the overall appearance of the typing machine. A table top 20 is supported at a typing height by a single long leg 21 and a pair of shorter legs 23 which support a cabinet portion 22. A keyboard 24 is mounted on table 20 and supports the keys 25. The keys 25 are commercially obtainable button switches which close electrical contacts. A monitor platen 26 and a printer platen 27 extend upward through the slots 28 and 29 formed in the table top 20. Suitable fastening devices 30 secure the sheets of paper 31 and 32 on the platens 26 and 27. Upon the depression of the keys 25 by an operator, material is typewritten on platen 26 with equal spacing between the words and the same material is typewritten after a short time lag on platen 27 with each full line justified.

Electrical elements and their associated circuitry, two tape perforators, and a tape reader, as well as other elements, which will be described, may be located within the cabinet 22. Easy access may be provided to these elements by means of suitable doors 34, swing-out chassis mounting panels 35, or the like.

Referring now to FIGURES 2 through 8, two complete units, as will now be described, actually impress the characters to be written on the sheets of paper 31 and 32 which are mounted on the platens 26 and 27.

A rectangular type magazine, as shown in FIGURE 3, consists of the four wafers or plates 41, 42, 43 and 44 which are bolted together by means of the screws or bolts 45.

Figure 3A:
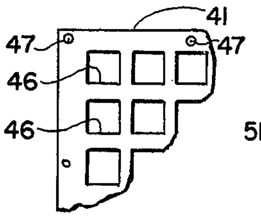
FIGURES 3A, 3B, 3C and 3D are plan views of wafers used to assemble a type magazine for square or rectangular type.
Figure 3B:
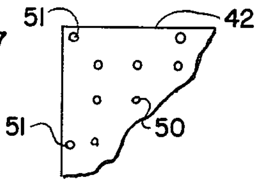
Figure 3C:
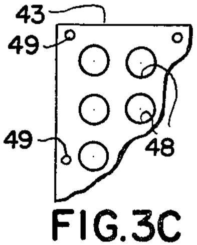
Figure 3D:
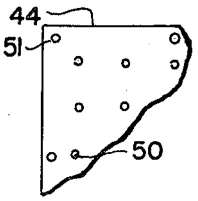

As shown in FIGURE 3A, plate 41 contains evenly spaced large rectangular apertures 46. It also contains the countersunk apertures 47 which receive the heads of the screws 45. Referring now to FIGURE 3C, plate 43 contains the evenly spaced large circular apertures 48 and the peripheral apertures 49 through which the screws 45 pass. As shown in FIGURES 3B and 3D, the plates 42 and 44 are identical and contain the evenly spaced smaller circular apertures 50 and the peripheral apertures 51 which receive the screws 45.

Referring now to FIGURE 5, rectangular blocks 52 are slidably disposed within the square apertures 46 formed in the assembled plate 41. The front faces of the blocks 52 have the type impressions 53 raised from them. A thinner cylindrical shaft 54 extends backward from each block 52 through the apertures 50 in the plates 42 and 44 so that the rearwardly disposed ends of the shafts 54 extend back a distance beyond plate 44. Each shaft 54 passes through one of the larger apertures 48 formed in plate 43. A collar 55 is fixed about each shaft 54 within the apertures 48 to force a compression spring 56, which is disposed about shaft 54, against plate 42. Thus it may be seen that the compression springs 56 each urge a shaft 54 rearwards to hold the rectangular type blocks 52 within the apertures 46 in the plate 41.

Referring now to FIGURES 2, 2A, 4 and 6, another embodiment of the type magazine 57 may be formed in the following manner. The wafers or plates 42, 43 and 44 are assembled with a front plate 58 using the screws 45. As shown in FIGURE 2A, plate 58 contains the evenly spaced round apertures 59 into the top of each of which there projects a small pin 60.

Referring now to FIGURES 4 and 6, the shafts 54, the collars 55 and the compression springs 56 are assembled in the same manner as was described in magazine 40. Fixed to each shaft 54 is a cylindrical block 61 containing a longitudinal groove 62 cut in its upper surface. When the type magazine 57 is assembled, the pins 60 extend into the grooves 62 to prevent any rotation of the blocks 61 within the type magazine. Raised type faces 63 are formed on the front surfaces of the cylindrical blocks 61.

Figures 7, 8:
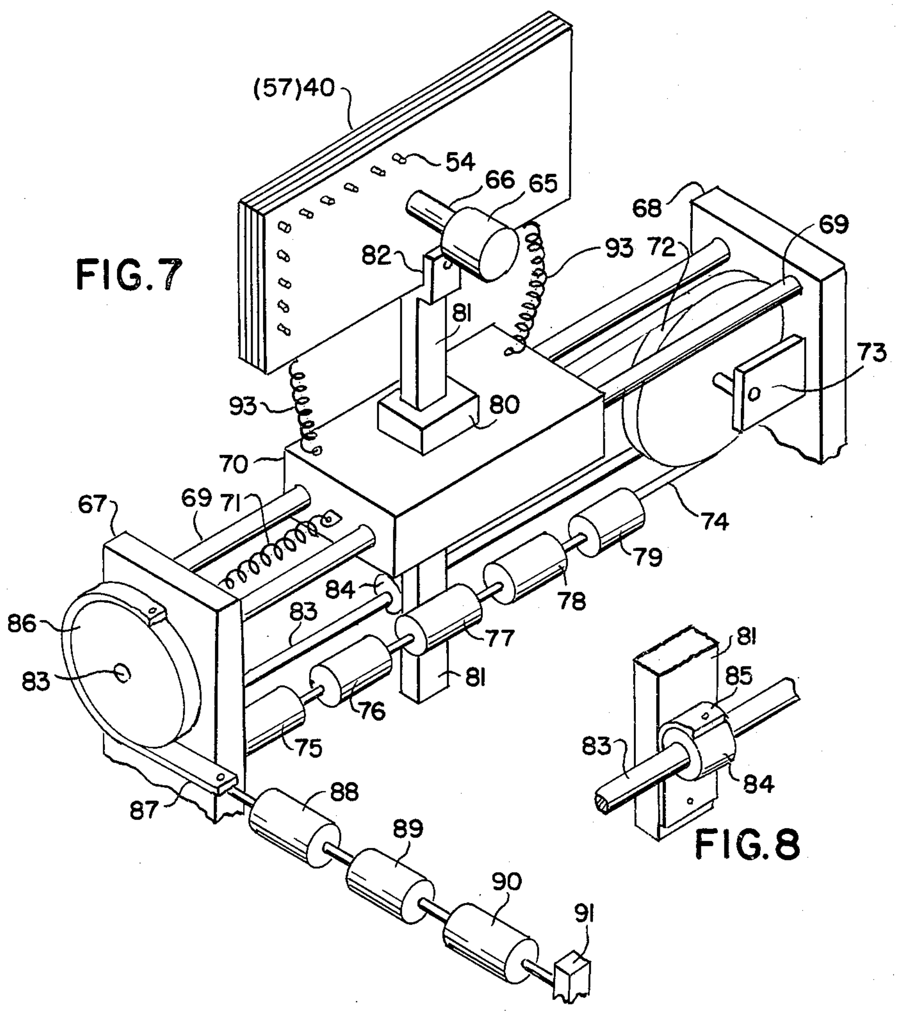
FIGURE 7 is a perspective view of the front of a type magazine positioning mechanism and a hammer solenoid showing the relative positions of these elements in this invention.
FIGURE 8 is a perspective view from the rear showing a fragment of the type magazine elevator bar, a fragment of the type magazine elevator shaft, and the associated elements which enable the rotation of the type magazine elevator shaft to raise the type magazine elevator bar.
Figure 8A:
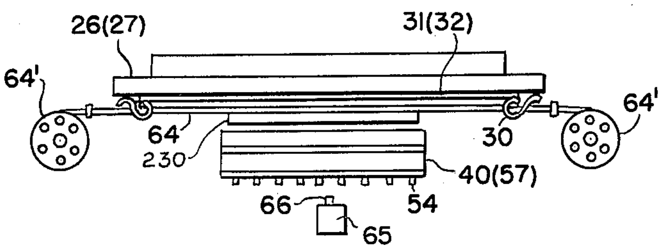
FIGURE 8A is a top view of a hammer solenoid, a type magazine, a ribbon, and a platen.

Referring now to FIGURES 5, 7 and 8A, a hammer solenoid 65 may be activated to extend its plunger 66 to strike a shaft 54 projecting rearward from a type magazine 40 or 57 to drive a block 52 or 61 forward and impress a character on the paper 31 or 32 held over a platen 26 or 27. A typewriter ribbon 64 is held and fed in front of the type magazine from the reels 64' by standard and well known mechanisms. A guide block 230 containing a tapered guide aperture 231 may be fixed relative to the frame of the machine so that each type block 52 always strikes in the same position. The apparatus which will now be described positions the type magazine 40 or 57 so that a given selected character on a block 52 or 61 may be driven forward and printed.

Referring now to FIGURE 7, two broken away portions 67 and 68 of the frame of the typing machine have the guide rails 69 extending between them. Slidably mounted to move laterally on the guide rails 69 is the type magazine carriage 70. A tension spring 71 urges the magazine carriage 70 along the guide rails 69 toward portion 67 of the frame. A pulley wheel 72 is rotatably mounted between projections 73 extending inward from the portion 68 of the frame. A thin steel ribbon 74, or any other suitable element, is fixed to the type magazine carriage 70 and extends about the pulley 72. Five solenoids 75, 76, 77, 78 and 79 are connected in a chain one end of which is secured to the end of ribbon 74 and the other end of which is secured to the projection 67 of the frame. These solenoids may slidably rest upon suitable tracks or rails as will later be described. The length of the stroke of solenoid 75 is adjusted so that it is equal to the lateral distance between the centers of two shafts 54 extending from a magazine 40 or 57. The stroke of solenoid 76 is adjusted to be twice the length of the stroke of solenoid 75, the stroke of solenoid 77 is adjusted to be four times the length of the stroke of solenoid 75, the stroke of solenoid 78 is adjusted to be eight times the length of the stroke of solenoid 75, and the stroke of solenoid 79 is adjusted to be sixteen times the length of the stroke of solenoid 75. Thus if all the solenoids 75 through 79 are activated, the magazine carriage will be moved to the right as shown in FIGURE 7 so that 31 shafts 54 will pass in front of the plunger 66 of the hammer solenoid 65. Therefore by not activating any of the relays 75 through 79 or by activating them in different combinations, 32 shafts 54 in a horizontal row may be brought beneath the plunger 66. For example, should it be desired to bring the first shaft 54 in a given horizontal row beneath plunger 66, none of the solenoids would be activated. Should it be desired to bring the 27th shaft 54 beneath plunger 66, solenoids 75, 76, 78 and 79 would be activated.

Referring further to FIGURE 7, it may be seen that the type magazine carriage 70 has a central boss 80 extending upward from it. Slidably disposed through this boss 80 is the type magazine elevator bar 81. This bar 81 has a forked upper portion 82 within which a type magazine 40 or 57 is secured. Rotatably journaled between the portions 67 and 68 of the frame is the splined or grooved shaft 83.

Referring now to FIGURE 8, a pulley 84 is slidably mounted on shaft 83 to rotate with it. A thin flexible steel band 85 is fixed to pulley 84 and extends about it and downward adjacent to the bottom of bar 81 to which it is also fixed. Thus it may be seen that the rotation of shaft 83 will raise or lower the support bar 81 and that the support bar 81 may move laterally as the carriage 70 slides from one side to the other.

Referring again to FIGURE 7, a pulley 86 is fixed to one end of shaft 83 and has a steel band 87 extending about and fixed to it. The steel band 87 is connected to three linked solenoids 88, 89 and 90. Solenoid 90 has the length of its stroke adjusted to raise bar 81, a distance equal to the vertical distance between the centers of two shafts 54 projecting from a magazine 40 or 57. Solenoid 89 has its stroke adjusted to be twice that of solenoid 90, and solenoid 88 has its stroke adjusted to be four times that of solenoid 90. This chain of solenoids is connected by means of solenoid 90 to a fragment of the frame of the machine 91. Therefore, by not activating any of the solenoids 88, 89 or 90 or activating them in various combinations, any one of eight horizontal rows of shafts 54 may be brought beneath the plunger 66 of the hammer solenoid 65. When the solenoids 88, 89 and 90 are de-activated, the tension springs 93 draw the type magazine down to its lowest position. Therefore, using the combination shown in FIGURE 7, a type magazine 40, may contain 256 types 52. It is again pointed out that two units such as that shown in FIGURE 7 must be provided in each typing machine to print on the monitor platen 26 and the printer platen 27.

Figures 9, 10, 11, 12:
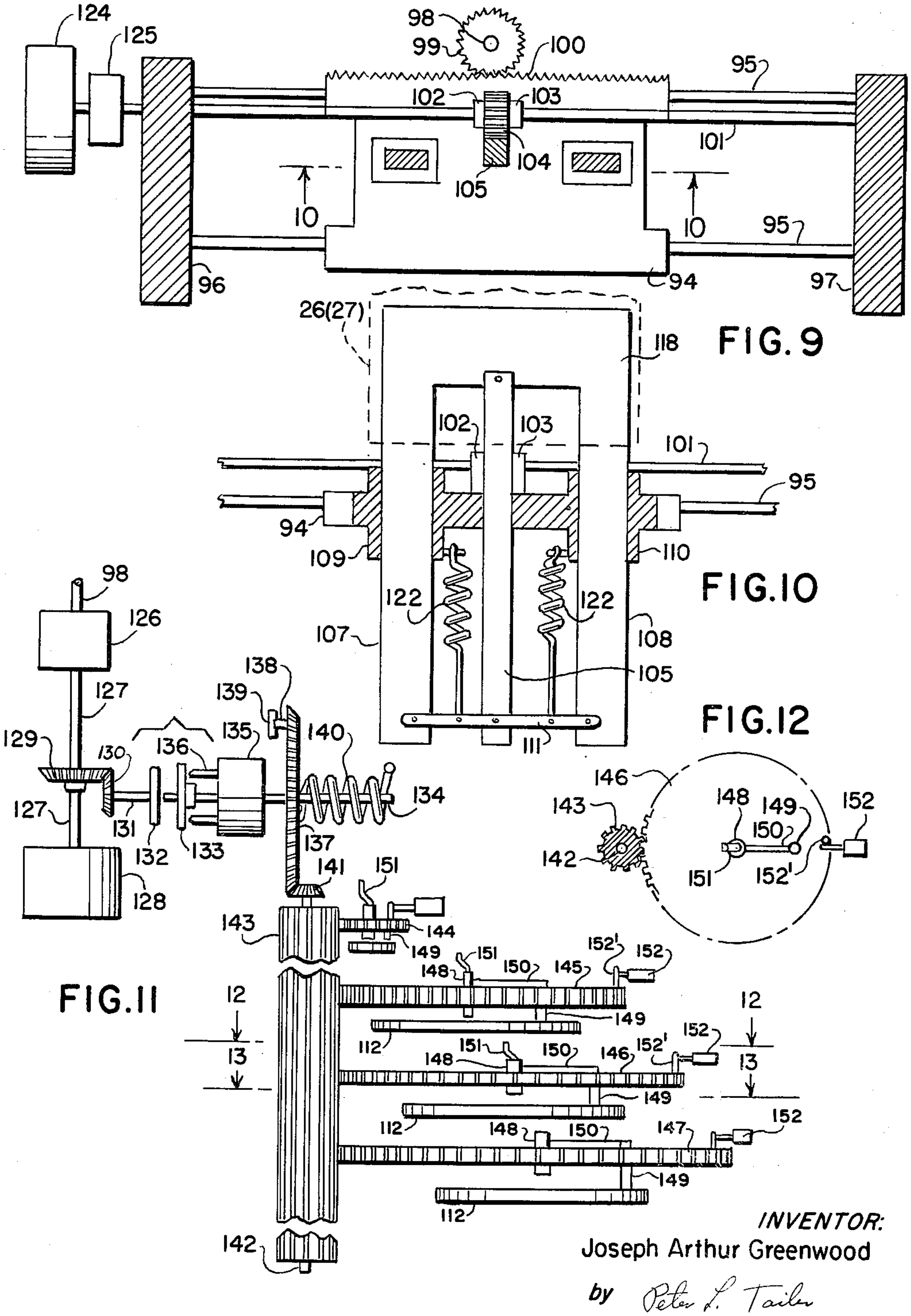
FIGURE 9 is a top view of the platen positioning mechanism.
FIGURE 10 is a vertical section taken on line 10—10 of FIGURE 9 showing the platen positioning mechanism.
FIGURE 11 is a front view of the horizontal platen movement mechanism and the clutch activated computer mechanism which is mounted on the monitor unit.
FIGURE 12 is a section taken on line 12—12 of FIGURE 11.

Refering now to FIGURES 9 and 10, each platen 26 and 27 is supported by a platen carriage 94. Each platen carriage 94 is slidably mounted on the parallel rails 95 which extend between fragments 96 and 97 of the frame. A vertical shaft 98 is journaled to extend upward behind the platen carriage 94. A spur gear 99 engages a rack gear 100 which is mounted on the platen carriage 94. Therefore, rotation of the vertical shaft 98 horizontally positions the platen carriage 94 along the rails 95.

Referring further to FIGURES 9 and 10, a horizontal splined shaft 101 is rotatably journaled between the fragments 96 and 97 of the frame. The shaft 101 passes above the platen carriage 94 and extends through the raised projections 102 and 103 which extend up from the carriage 94. Between the projections 102 and 103 there is slidably mounted on the shaft 101 a spur gear 104. This spur gear 104 engages the rack gear 105 which passes vertically through the center of the carriage 94.

As shown in FIGURE 10, a platen support member 118 has the two legs 107 and 108 which slidably extend through the bosses 109 and 110 in carriage 94. The rack gear 105 is connected to the top portion of the platen support member 118. A cross brace 111 is attached to the bottoms of the legs 107 and 108 and has the tension springs 122 extend from it to the platen carriage 94. Thus it may be seen that the rotation of the splined shaft 101 will raise or lower the platen support member 118 by means of the gear 104 and the rack gear 105.

As is further shown in FIGURE 10 in dotted lines, a platen 26 or 27 is fixed to the platen support member 118. If it is desired, the platen 26 or 27 may be secured to the platen support member by a suitable indexing means (not shown) so that the platen may be rotated through 90 degrees in a vertical plane to increase the versatility of this typing machine.

Referring again to FIGURE 9, a suitable escapement or a drive 124 is connected to shaft 101 through a variable speed gear box 125. If unit 124 is a mere escapement, the platen 26 or 27 may be manually depressed stretching the springs 122 so that the electrically activated escapement 124 may let the platen support member 118 rise to move the platen upwards as each line is printed.

Referring now to FIGURE 7, if may be seen that any number of type magazines 40 or 57 may be easily interchanged and placed upon the magazine support bar 81. Since different type magazines 40 may be provided with different sizes of characters, when larger characters are printed, the distance between the printed lines should be greater. Therefore, referring again to FIGURE 9, the variable speed gear box 125 may be set to alter the ratio between the escapement or drive 124 and the shaft 101 to vary the space between the printed lines.

Referring now to FIGURE 11, both the platen carriages supporting the monitor platen and the printer platen are moved horizontally by the rotation of a shaft 98. Shaft 98 is driven by a variable speed gear box 126 which, in turn, is driven by the shaft 127 and the electrically activated drive or escapement 128. The gear box 126 serves the same purpose as the gear box 125 in that it varies the ratio of rotation between the shafts 98 and 127 to enable the gear 99 as shown in FIGURE 9 to advance a platen a greater horizontal distance when larger characters are printed.

As is further shown in FIGURE 11, the horizontal drive of the monitor platen support has associated with it several additional computer elements. As bevel gear 129 drives another bevel gear 130 which is mounted on a shaft 131 to rotate a clutch plate 132. Another clutch plate 133 is slidably mounted on a shaft 134 which passes through a clutch activating solenoid 135. When solenoid 135 is activated, the projections 136 extend from the solenoid 135 to slide and engage the clutch disk 133 with the clutch disk 132.

After a complete line has been typed on the keyboard 24 and the unjustified typed line has appeared on the paper secured to the monitor platen 26, a line delivery button on keyboard 24 is pressed. This line delivery button causes the escapement or drive 128, as will later be described, to advance the platen support carriage 94 to a pre-set left hand end of a line. After the carriage 94 reaches its end position, drive 128 moves it rapidly back to the right to the start position for the next line and drive 124 raises the platen at the same time. However, before the platen carriage 94 is advanced to its end position, solenoid 135 is activated to engage the clutch disks 132 and 133. Thus shaft 134 is rotated through a number of degrees corresponding to the remaining space in each line. A bevel gear 137 is rotated by a spring 140 to hold a pin 138 which is fixed in bevel gear 137 against a stop 139. Therefore, before the clutch disks 132 and 133 are engaged, shaft 134 and bevel gear 137 are always in the same position. Bevel gear 137 drives the smaller bevel gear 141 which is mounted on a shaft 142. Shaft 142 carries the elongated pinion 143 which extends for substantially the entire length of shaft 142. A series of spur gears, of which spur gears 144, 145, 146 and 147 are shown, are rotatably journaled to engage the elongated pinion 143. The spur gears 144 through 147 are each successively larger than the next. Each gear 144–147 has a pitch diameter which is a whole number multiple of a given fraction of the pitch diameter or of the whole pitch diameter of the elongated pinion 143. The spur gears 144 through 147 may be formed from an insulating material and mounted on the short rotatably journaled shafts 148. While only a few spur gears 144 through 147 are shown, the actual number of such spur gears would be equal to the maximum number of spaces between words which would be anticipated in one typed line. Eighteen gears would suffice in an average machine.

Referring now to FIGURE 12, each gear 144 through 147 contains a single electrical brush contact 149 extending through it. Each brush 149 is electrically connected to a shaft 148 by a strip of conductive material 150. An electrical contact 151 also makes a connection with each shaft 148. Each gear 144 through 147 has a pin 152′ extending from it which contacts the sensing element of a switch 152 each time the gear makes a complete revolution.

Figure 13:
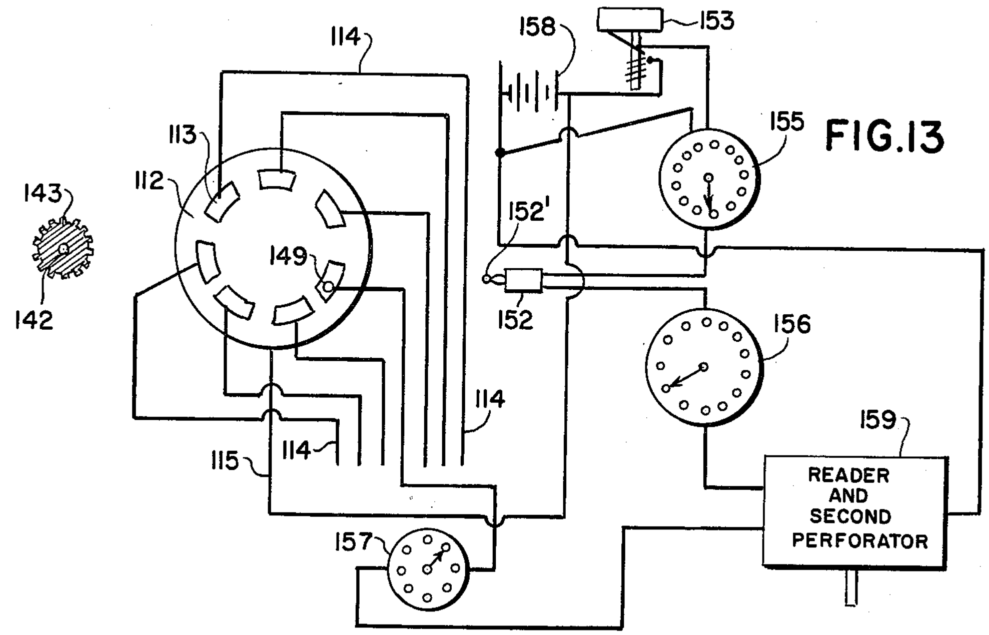
FIGURE 13 is a section taken on line 13—13 of FIGURE 11 with associated elements shown connected in a wiring diagram.

Referring now to FIGURES 11 and 13, a switch disk 112 is mounted adjacent to each gear 144 through 147. The switch disks 112 are of a non-conducting material and each disk has a number of contact elements 113 mounted on it to be contacted by a brush 149. Leads 114 extend from each contact element 113. The number of contact elements 113 on each switch disk 112 is directly proportional to the ratio of the pitch diameter of the adjacent gear 144–147 to the pitch diameter of the elongated pinion 143. Thus, as an example, the switch disk 112 adjacent to the gear 146, which has a pitch diameter seven times that of pinion 143, contains seven contact elements 113. The gear ratios between the pinion 143 and the series of gears 144–147 are in a direct proportion to an increasing series of whole numbers so that the first disk 112 contains one contact element, the second disk 112 contains two contact elements, the third disk 112 contains three contact elements, etc., to provide as many contact elements as may be required on the last disk 112.

If the horizontal platen drive 128 permits fully proportional spacing of letters in accordance with the Monotype system of 12 different character widths, a ratchet wheel will be mounted within the drive 128 and a number of teeth from eighteen to five of this ratchet will be released or driven according to the width of the character previously struck. The gear ratio between the drive 128 with its shaft 127 and the shaft 142 carrying pinion 143 is such that the escape or drive of one tooth of the ratchet within escapement 128 will cause the pinion 143 to rotate and turn each gear 144 through 147 to advance each brush 149 to an adjacent contact 113.

Figure 15:
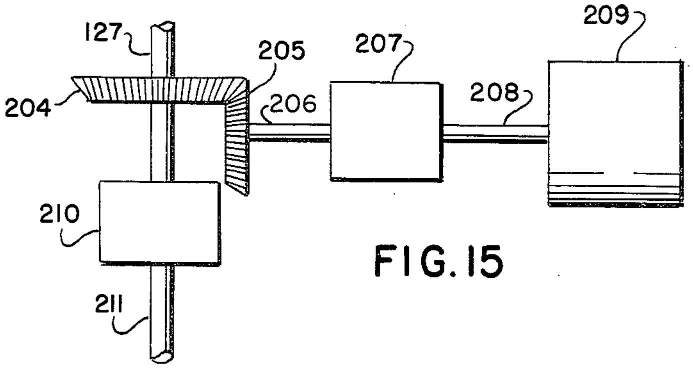
FIGURE 15 is a side view of a portion of the horizontal platen movement mechanism.
Figure 16:
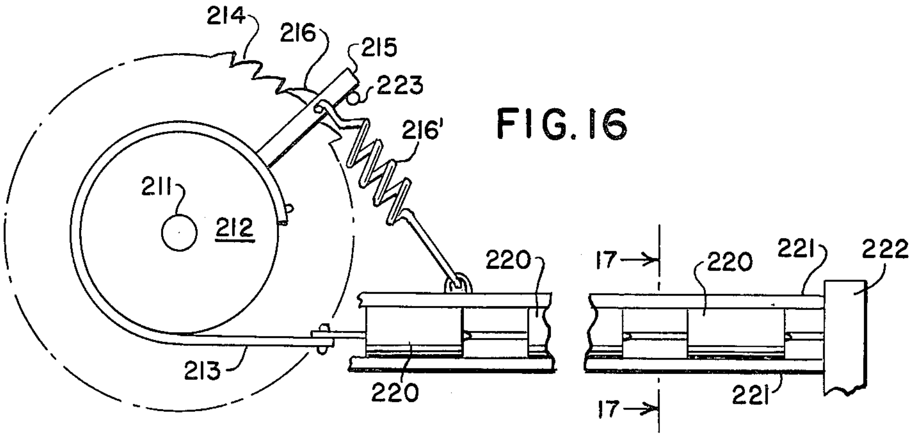
FIGURE 16 is a bottom view of a further portion of the horizontal platen movement mechanism.
Figure 17:
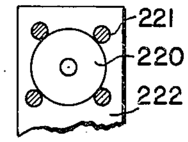
FIGURE 17 is a section taken on line 17—17 of FIGURE 16.

The elements comprising such a drive unit 128 are shown in FIGURES 15, 16 and 17. A bevel gear 204 is mounted on shaft 127 and drives the bevel gear 205 which is mounted on the shaft 206. A clutch 207 may be electrically activated to engage the shafts 206 and 208 which is driven by the line delivery drive 209. By means of another electrically activated clutch 210, shaft 127 may be driven by shaft 211.

As shown in FIGURES 16 and 17, a pulley 212 is mounted to rotate freely about shaft 211. A ratchet wheel 214 is fixed on shaft 211 above the pulley 212. An arm 215 is fixed to pulley 212 and drives the ratchet 214 in one direction by means of the pawl 216. A thin steel band 213 extends about pulley 212 and is connected to the banged solenoids 220. These solenoids 220 are connected to each other in a chain and which is attached to the steel ribbon 213 and to a portion 222 of the frame of the machine. The solenoids 220 are slidably disposed between the rails 221 which support them. The lengths of the strokes of the solenoids 220 are adjusted so that they can be energized in appropriate combinations to rotate the pulley 212 and advance from five to eighteen teeth of the ratchet 214. When the solenoids 220 are de-energized, the spring 216′ returns the arm 215 against the stop 223.

Thus, after each character is typed, the solenoids 220 rotate the ratchet 214 and the clutch 210 is engaged to advance a platen 26 or 27. When a line delivery button is pressed, clutch 210 is disengaged, clutch 207 is engaged, and the drive unit 209 advances the platen 26 to the end of a line and then returns it to start the next line.

Referring again to FIGURE 13, a lead 115 is connected to each contact 151. As a line is typed and appears on the monitor platen, each time the space bar 153 is depressed, a stepping switch 155 advances one point to store information as to the number of space bar depressions registered in the line. As it is shown in FIGURE 13, seven space bar depressions were indicated in the line and switch 155 has advanced to position 7 to select the electrical circuit connected to the gear 146, which, in this example, is seven times the pitch diameter of the pinion 143. Referring also to FIGURE 11, when the clutch plates 132 and 133 are engaged as the line delivery button is pressed, pinion 143 will rotate once for each space or proportional space remaining in the line. For example, if this invention is applied to spacing such as used with a conventional typewriter wherein one size of space is allotted for each character and between words, the pinion 143 will rotate once for each space remaining in a line when the line delivery button 251 is pressed.

Proportional spacing is well known and may also be applied to this invention. One system provides 21 proportional spaces, a number of which are used for each character. Thus when an "I" is typed, the platen advances 9 proportional spaces, when an "N" is typed, the platen advances 14 proportional spaces, and when an "M" or "W" is typed, the platen advances 21 proportional spaces. The depression of the space bar advances the platen a set number of proportional spaces. If the proportional spacing system is used with this invention, pinion 143 will rotate once for each proportional space remaining in a line after the line delivery button is pressed. Referring also to FIGURE 11, a switch 152 will be activated by each passage of a pin 152' to advance the stepping switch 156 one position for each such contact made. When gear 146 comes to rest, the brush 149 contacts a contact member 113 so that the appropriate lead 114 will cause the stepping switch 157 to register the fractional degree of rotation of the gear 146. As the switches 155 and 157 are shown in FIGURE 13, gear 146 would have described nine and three-sevenths full revolutions. By means of the power source 158, this information is later conveyed to the reader and perforator 159.

A stepper switch of the type such as may be employed in a slower operating experimental version of this invention is the stepper switch manufactured by Guardian Electric which carries their part number #IR–MER 115–115 V.A.C. and is so identified in their 1960 catalog. The reader and second perforator 159 reads the coded perforations on tape 161 which indicate a depression of the space bar and then it punches additional perforations on tape 161 encoding signals from computer 162 so that reader translator 166 will read the combined perforations to activate the printer to produce justified lines. All the elements of such a reader and second perforator may be found in the U.S. Patents 2,390,413; 2,555,734; 2,700,421; 2,700,446; and 2,700,447.

Figure 14:
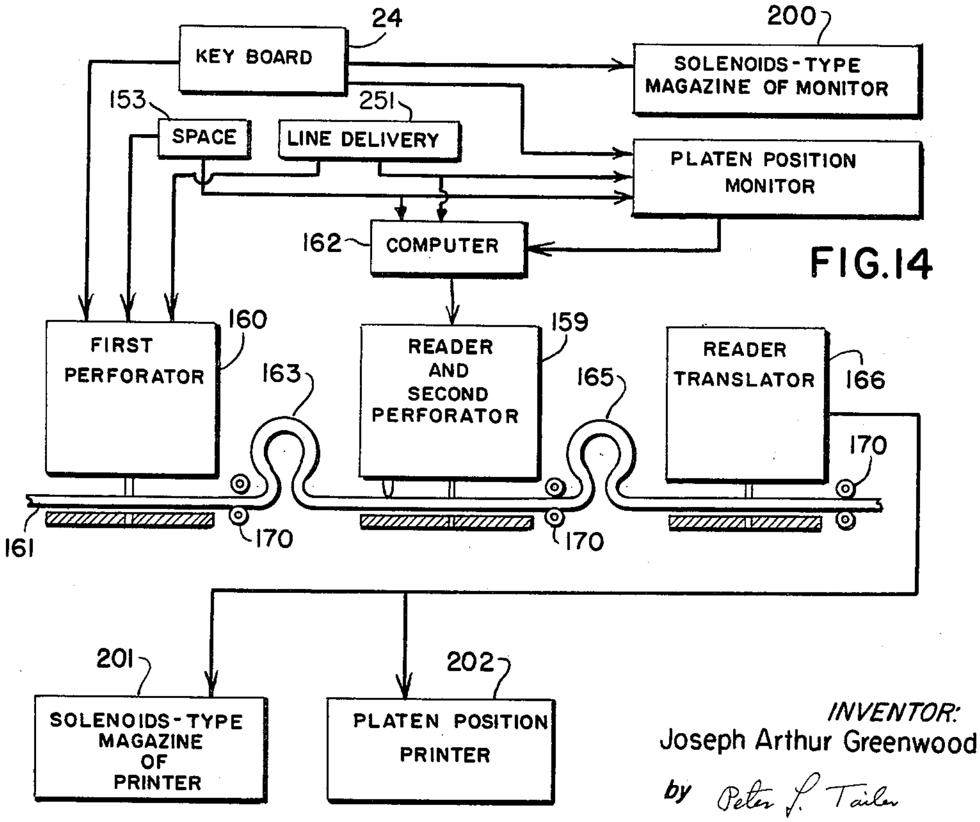
FIGURE 14 is a schematic drawing showing the interrelation and the interaction of all the elements of this invention.

Referring now to FIGURE 14, my invention operates in the following manner. As the keyboard 24 is manipulated, it activates the solenoids 75 through 79 and the solenoids 88 through 90 in the type magazine positioning system 200 of the monitor. At the same time, the manipulation of keyboard 24 activates a first perforator 160 which perforates a strip of paper tape 161 according to the characters printed on the monitor platen. The technique of perforating tape according to characters printed is well known and is shown in the United States Patent No. 2,700,421 to E. O. Blodgett in his FIGURES 53 and 54.

The manipulation of the keyboard 24 also activates the platen positioning escape mechanisms 124 and 128 of the monitor platen 26. These mechanisms, as the space bar 153 and the line delivery button 251 are manipulated, feed information to the computer 162, which is shown in FIGURES 11, 12 and 13. Thus the tape 161 is perforated first by the first perforator 160 according to the characters written and it has coded on it each depression of the space bar 153 and each depression of the line delivery button 251. The tape 161 describes a loop 163 and then passes beneath the reader and second perforator 159. Unit 159 additionally perforates and codes the tape 161 at each place on tape 161 at which perforations indicate a depression of the space bar 153 betwen depressions of the line delivery button 251 according to information received from the computer 162.

If, as shown in FIGURE 13, the space bar 153 was depressed seven times in a given line, stepping switch 155 would select the electrical circuit associated with gear

146. If the remaining movement of the platen carriage, after pushing the line delivery button 251, caused gear 146 to rotate nine and three-sevenths revolutions, stepping switch 156 would advance to position 9 and stepping switch 157 would be advanced or automatically set to position 3.

As tape 161 passed beneath the reader and second perforator 159, unit 159 would detect the first signal representing the depression of space bar 153 and it would, in this place, print a code which would indicate an advance of nine additional units with each full space bar depression. In addition, stepper switch 157 would cause the perforator to indicate an advance of one additional unit for the first space. The perforator and reader 159 would send a signal to stepper switch 157 so that it would step backwards one position each time a space signal passed beneath perforator and reader 159. Therefore, in the given example, the tape 161 would have the reader and second perforator 159 indicate an advance of nine additional units plus one additional unit for the first three spaces, and nine additional units for the last four spaces.

As further shown in FIGURE 14, tape 161 passes in a second loop 165 to be read by the reader translator 166. Such a reader translator is described in the United States Patent No. 2,700,446 to E. O. Blodgett. The reader translator 166 then activates solenoids 201 to position the type magazine in the printer and it activates the escapements or drives 124 and 128 to position the platen 27 of the printer. As each line is then typed on the printer platen 27, the lines are justified. Drive rollers 170 advance the tape 161 past the various units.

The detailed circuitry required to wire this invention according to the diagram shown in FIGURE 14 has not been shown as it is well within the capability of one skilled in the art. In addition, the details of the stepper switches, the perforator, the reader and second perforator, and the reader translator have not been described as such are units known in the art.

While I have disclosed my invention in the best form known to me, it will nevertheless be understood that this is purely exemplary and that modifications in the construction, arrangement and combination of parts, and the substitution of equivalents mechanically and otherwise may be made without departing from the spirit of the invention except as it may be more limited in the appended claims.

I claim:

1. In a typing machine having a keyboard and a space bar, a pinion, means rotating said pinion according to the unjustified spaces remaining in a line, a series of gears engaging said pinion, each of said gears being successively larger in pitch diameter so that the gear ratios between said gears and said pinion is in a direct proportion to an increasing series of whole numbers, first switch means responsive to the rotation of each of said gears, second switch means responsive to the depression of the space bar of said keyboard during the typing of a line, said second switch means selecting that one of said first switch means associated with the one of said gears having a proportion between its pitch diameter and that of said pinion which is in a direct proportion to the whole number in an increasing series which whole number is equal to the number of times said space bar was depressed during the typing of a line.

2. In a typing machine having a keyboard with a space bar, computing means to determine the space required between words to justify a line of type comprising, a pinion, means rotating said pinion according to the number of unjustified spaces remaining in a typed line, a series of gears engaging said pinion, each of said gears having a pitch diameter which is a multiple of the pitch diameter of said pinion so that the gear ratios of said pinion and said series of gears are in direct proportion to an increasing series of whole numbers, first switch means responsive to the rotation of each of said gears, second switch means responsive to the depression of said space bar during the typing of a line, said second switch means selecting said first switch means associated with that one of said gears whose pitch diameter is as many times larger than the pitch diameter of said pinion as the number of times said space bar was depressed during the typing of a line.

3. In a typing machine having a keyboard with a space bar and a line delivery button, a carriage, means advancing said carriage to the pre-set end of a line on the pressing of said line delivery button, and a shaft rotated by said means advancing said carriage to the pre-set end of a line according to the travel of said carriage; computing means to determine the space required between words to justify a line of type comprising, in combination, an elongated pinion, a clutch engaging said shaft to said pinion so that said shaft rotates said pinion, means activating said clutch to engage said shaft to said pinion as said carriage advances to the pre-set end of a line, spring means against which said pinion is rotated by said shaft when said clutch is activated, stop means engaged upon the rotation of said pinion by said spring means, a series of gears engaging said pinion, each of said gears being successively larger in pitch diameter so that the gear ratios between said gears and said pinion is in a direct proportion to an increasing series of whole numbers, a series of first switch means, each switch means being responsive to the rotation of one of said gears, second switch means responsive to the depression of said space bar of said keyboard during the typing of a line, said second switch means selecting that one of said first switch means associated with the one of said gears having a proportion between its pitch diameter and that of said pinion which is in a direct proportion to the whole number in an increasing series which whole number is equal to the number of times said space bar was depressed during the typing of a line.

4. The combination according to claim 3 wherein each first switch means in said series of first switch means comprises a first switch, a pin projecting from the gear associated with said first switch means activating said first switch upon each rotation of the gear associated with said first switch means, a brush projecting from the gear associated with said first switch means, a switch disk adjacent to the gear associated with said first switch means, said switch disk having a number of contacts spaced apart in a circle and contacted by said brush upon the rotation of said gear, the number of contacts on said switch disk being equal to the whole number in an increasing series which whole number is equal to the proportion between the pitch diameter of the gear associated with said first switch means and the pitch diameter of said pinion.

References Cited by the Examiner

UNITED STATES PATENTS

| | | | |
|---|---|---|---|
| 896,913 | 8/08 | Hopkins | 197—56 |
| 1,876,502 | 9/32 | Kittel | 197—148 X |
| 2,112,943 | 4/38 | Wells | 197—84 |
| 2,197,867 | 4/40 | Klement | 101—110 X |
| 2,379,862 | 7/45 | Bush | 197—84 |
| 2,700,421 | 1/55 | Blodgett | 234—9 |
| 2,846,932 | 8/58 | Hooven et al. | 95—4.5 |
| 2,879,876 | 3/59 | Palmer et al. | 197—16 |
| 2,903,962 | 9/59 | Henderson | 101—109 |
| 2,978,086 | 4/61 | Hickerson | 197—16 |
| 2,986,256 | 5/61 | Weaver | 197—56 |
| 2,989,666 | 6/61 | Brenner et al. | 317—123 |
| 3,035,677 | 5/62 | Henderson | 197—151 X |
| 3,108,673 | 10/63 | Green | 101—109 X |

FOREIGN PATENTS

| | | |
|---|---|---|
| 391,602 | 5/33 | Great Britain. |

ROBERT E. PULFREY, *Primary Examiner.*